United States Patent [19]

Sato

[11] Patent Number: 4,730,245

[45] Date of Patent: Mar. 8, 1988

[54] POWER CUT DETECTION APPARATUS FOR POWER CONVERTER

[75] Inventor: Hirokazu Sato, Tokyo, Japan

[73] Assignee: Kabushiki Kaisha Toshiba, Kanagawa, Japan

[21] Appl. No.: 909,724

[22] Filed: Sep. 22, 1986

[30] Foreign Application Priority Data

Sep. 27, 1985 [JP] Japan .................................. 60-213816

[51] Int. Cl.⁴ ............................................. H02H 7/125
[52] U.S. Cl. ........................................ 363/54; 363/85; 363/128
[58] Field of Search .................. 363/53, 54, 85–87, 363/128–129; 361/86, 100

[56] References Cited

U.S. PATENT DOCUMENTS 3,646,423 2/1972 Tatematsu et al. .................... 363/54
4,044,295 8/1977 Ferraiolo et al. ..................... 363/54
4,218,729 8/1980 Chambers ............................. 363/54

FOREIGN PATENT DOCUMENTS 0135874 1/1987 European Pat. Off. .
3218885 11/1983 Fed. Rep. of Germany .
60-66602 4/1985 Japan .

Primary Examiner—Peter S. Wong
Attorney, Agent, or Firm—Schwartz, Jeffery, Schwaab, Mack, Blumenthal & Evans

[57] ABSTRACT

A power converter having an ac side connected through a reactor to an ac power source and a dc side connected to a smoothing capacitor and a load, the converter being capable of converting and inverting electric power in accordance with the pulse width modulation control, characterized by comprising: a voltage detection circuit for detecting a voltage on the side of the ac power source when viewed from the reactor; a first judgement section for detecting that the amplitude of a voltage component on the ac side of the power converter, which is included in the ac power source voltage, is above a predetermined value on the basis of an output signal from the voltage detection circuit to produce a signal indicative of the judgement result; a second judgement section for detecting that the amplitude of the ac power source voltage is below the predetermined value to produce a signal indicative of the judgement result; and a gate circuit for performing logical sum of the outputs from the first and second judgement sections to use an output signal from the gate circuit as a detection signal indicative of a power interruption of the ac power source.

8 Claims, 9 Drawing Figures

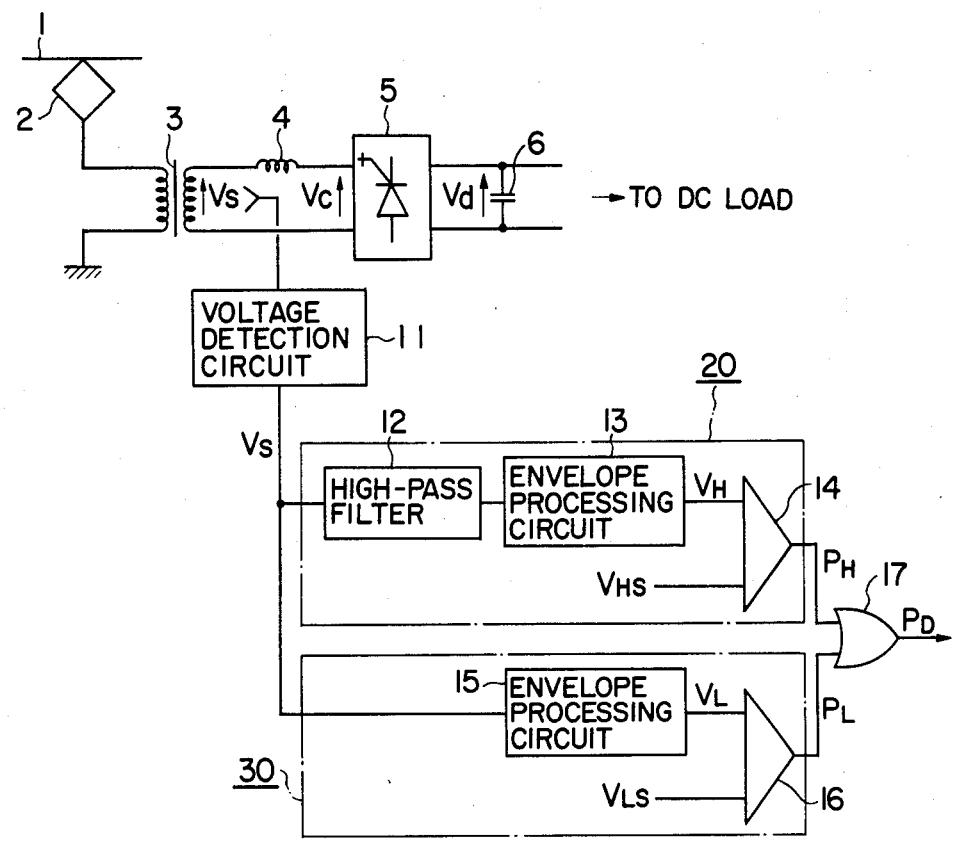
F I G. 1
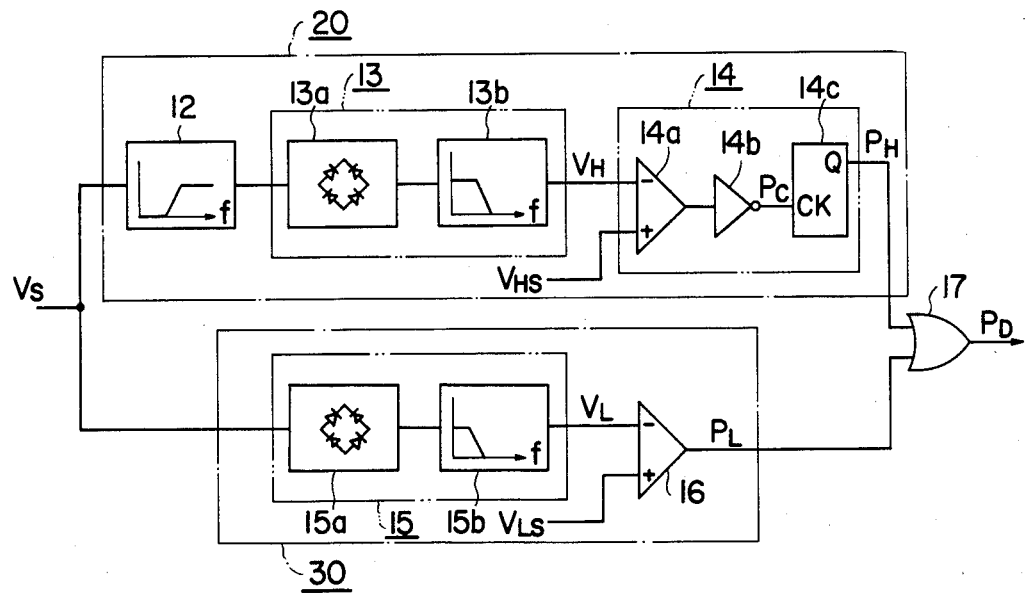
F I G. 2

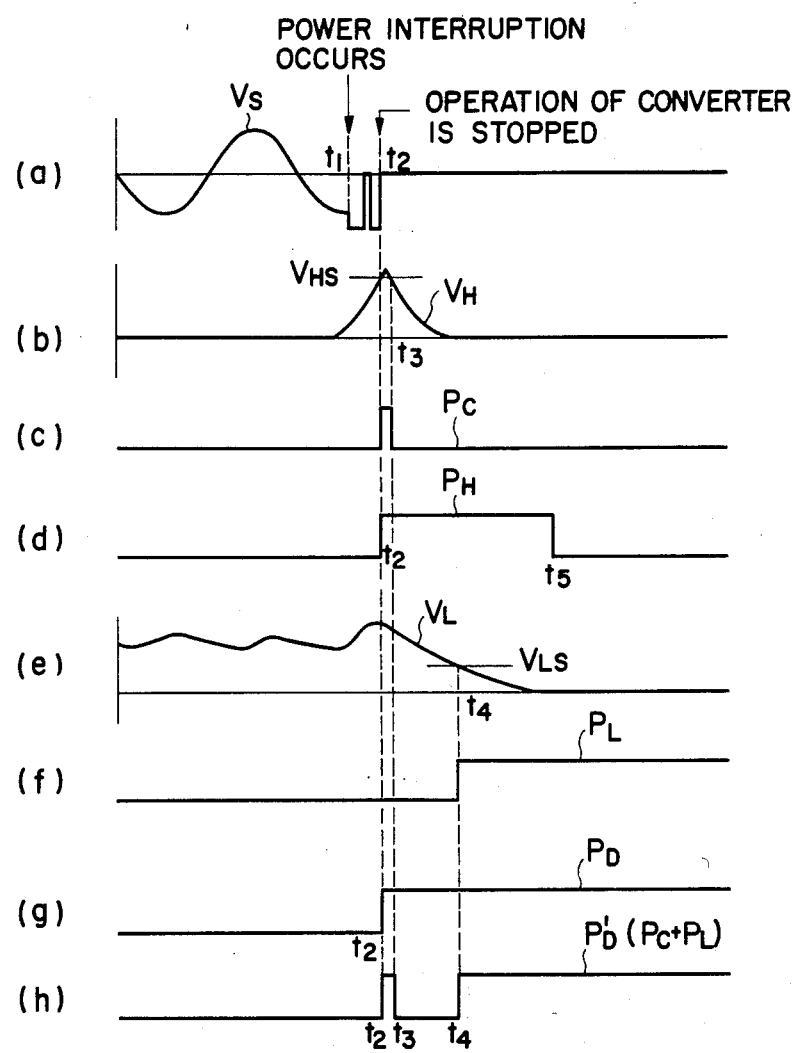
F I G. 3

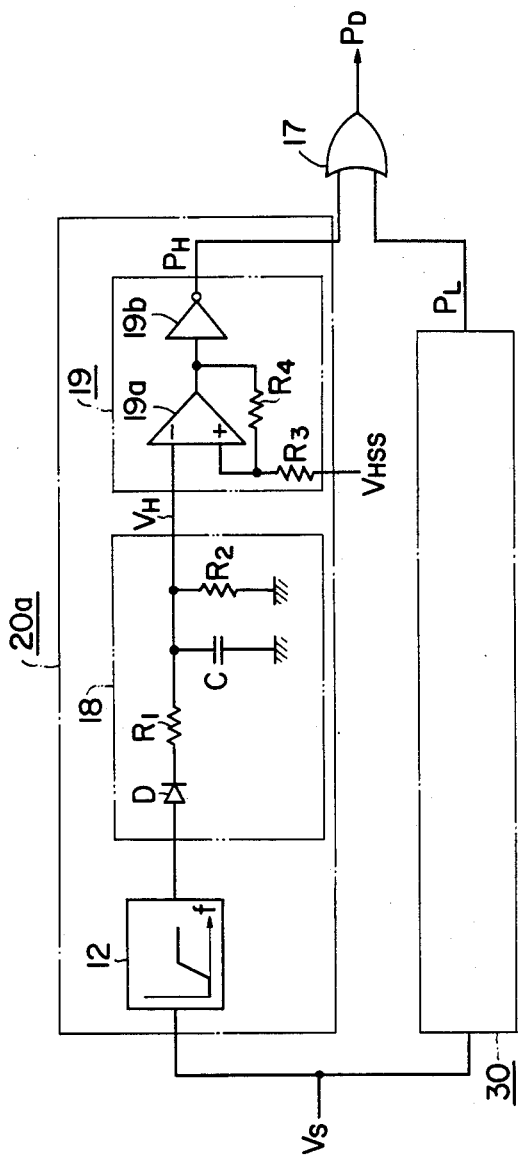
F I G. 4
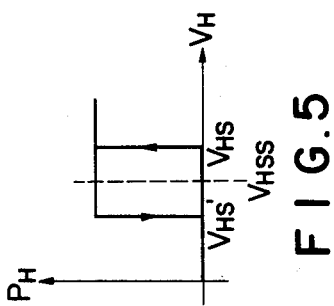
F I G. 5

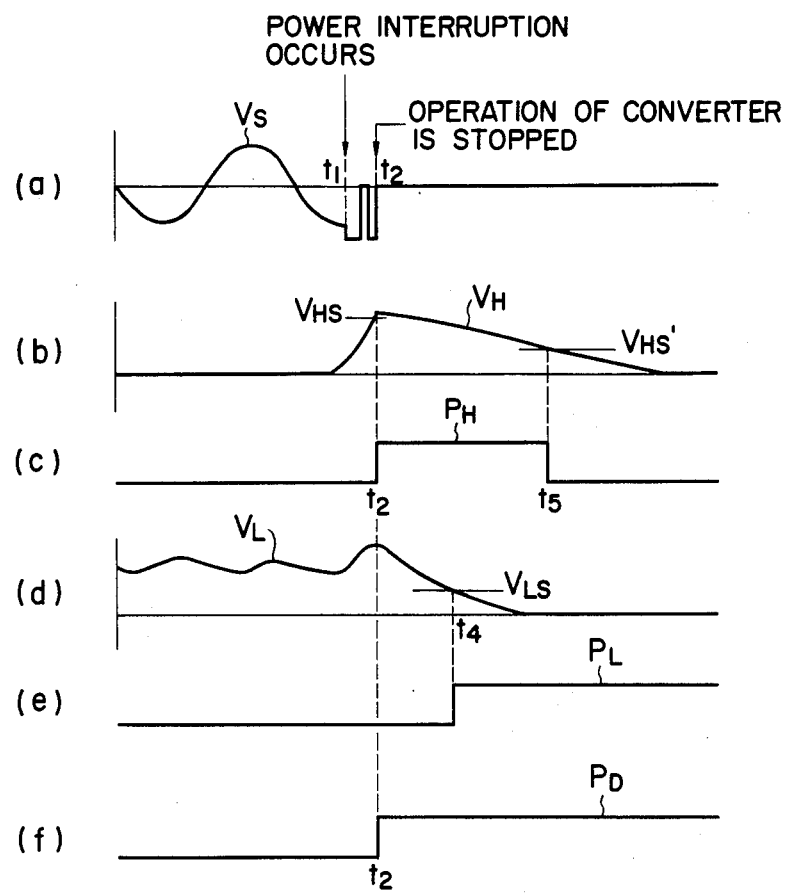
F I G. 6

POWER CUT DETECTION APPARATUS FOR POWER CONVERTER

BACKGROUND OF THE INVENTION

The present invention relates to a power converter which is capable of converting an alternating current to a direct current and inverting a direct current to an alternating, current, and more particularly to a power cut detection apparatus which detects a power cut of an alternating power source to which the power converter is connected.

When a power converter, which converts an ac (alternating current) power from a commercial power source to a dc (direct current) power to supply the dc power to loads, is constituted simply with a diode bridge, there are instances where reactive power which changes the line voltage is produced at the side of the commercial power source, or higher harmonics which cause inductive interference on communication lines such as telephone lines close to the power-transmission lines, are produced.

In order to solve such troubles, a power converter, which is so called a PWM converter, has already been put into practical use and is composed of self-quenching elements such as GTOs (gate turn-off thyristors) or transistors which are controlled on the basis of the pulse width modulation method.

This power converter, however, has the problem that when installed in an electric railcar, a high voltage may be produced due to a power cut or interruption which is unavoidable in the electric railcar, thereby causing destruction of and/or damage to the converter.

SUMMARY OF THE INVENTION

The present invention has been made in view of the above, and its object is to provide a power cut detection apparatus for a power converter which is capable of sufficiently protecting various devices when the ac power source is interrupted.

In order to attain this object, the present invention provides a power converter having an ac side connected through a reactor to an ac power source, and a dc side connected to a smoothing capacitor and a load, the converter being capable of converting and inverting electric power in accordance with the pulse width modulation control, and having a voltage detection circuit for detecting a voltage on the side of the ac power source when viewed from the reactor; a first judgement section for detecting that the amplitude of a voltage component on the ac side of the power converter, which is included in the ac power source voltage, is above a predetermined value on the basis of an output signal from the voltage detection circuit to produce a signal indicative of the judgement result; a second judgement section for detecting that the amplitude of the ac power source voltage is below the predetermined value to produce a signal indicative of the judgement result; and a gate circuit for performing logical sum of the outputs from the first and second judgement sections to use an output signal from the gate circuit as a detection signal indicative of a power interruption of the ac power source.

BRIEF DESCRIPTION OF THE DRAWINGS

In the accompanying drawings:

FIG. 1 is a block diagram showing the circuit configuration of one embodiment according to the present invention together with a power feed system for an electric railcar;

FIG. 2 is a block diagram showing details of the circuit configuration of the main portion of the above-mentioned embodiment;

FIG. 3 is a timing chart for explaining the operation of the above-mentioned embodiment;

FIG. 4 is a circuit diagram showing the essential portion of another embodiment according to the present invention;

FIG. 5 is dynamic characteristic diagrams of the main elements of the second mentioned embodiment;

FIG. 6 is a timing chart for explaining the operation of the second mentioned embodiment;

DETAILED DESCRIPTION OF THE INVENTION

Prior Art

Figure 7:
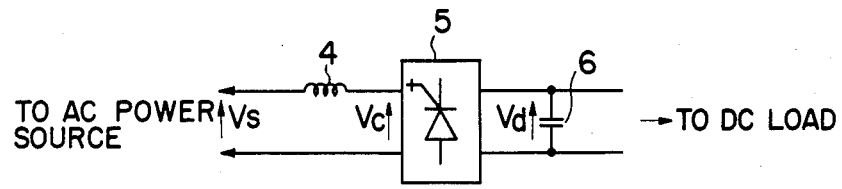
FIG. 7 is a schematic diagram showing the circuit configuration of a conventional power converter.

FIG. 7 is a circuit diagram showing the circuit configuration of the essential portion of a conventional power converter referred to as a PWM converter. A power converter 5 is connected on its ac side to an ac power source via a reactor 4 and on its direct current side to a smoothing capacitor 6 and a dc load. When the power converter 5 is controlled on the basis of the pulse width modulation in accordance with an ac power source voltage $V_s$ and a voltage across the capacitor 6, i.e., a voltage $V_d$ on the dc side etc., thereby to control the amplitude of the fundamental frequency component of the ac side voltage $V_c$ of the power converter 5 and the phase with respect to the ac power source voltage $V_s$, fluctuations of the line voltage and the inductive interference mentioned above can be prevented.

There is a strong movement on foot to apply the power converter to an electric railcar. In this case, ac electric power is available via a pantograph and a transformer connected thereto. A power interruption peculiar to the electric railcar will occur when the pantograph is disconnected from an overhead wire or when the car passes through a substation switching section. If the pulse width modulation control is maintained during such a power interruption, high voltage may occur to destroy and/or damage the devices connected to the converter. This will now be described briefly.

Figure 8:
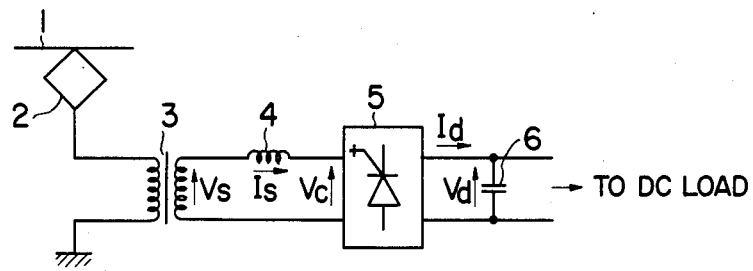
FIG. 8 is a systematic diagram in which the above-mentioned conventional power converter is used for control of an electric railcar.

As shown in FIG. 8, assume that the primary side of a transformer 3 is connected between a pantograph 2 in contact with an overhead wire 1 and ground and that the secondary side of the transformer is connected via a reactor 4 to the converter 5 to control it on the basis of the pulse width modulation method.

Figure 9:
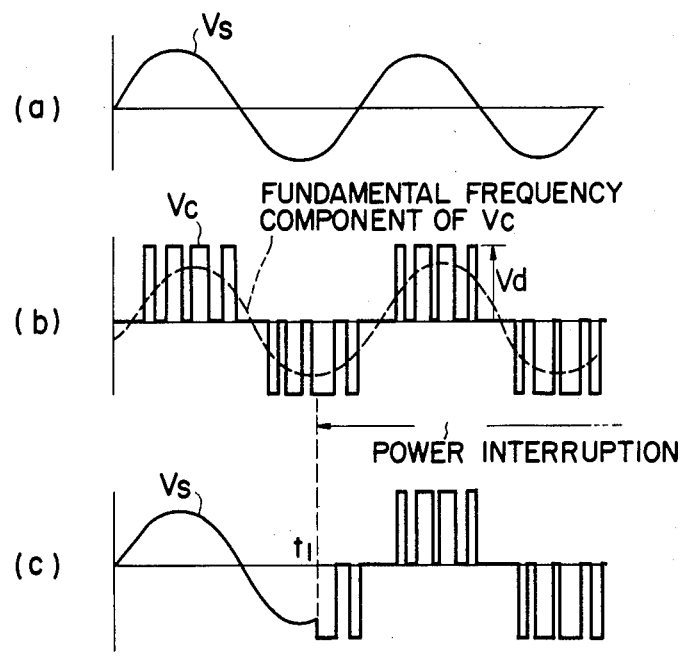
FIG. 9 is a timing chart for explaining the operation of the conventional power converter.

FIGS. 9(a) and (b) show a transformer secondary voltage $V_s$ and an ac side voltage $V_c$ of the power converter 5, respectively, produced when the pulse width modulation control is effected. By controlling the power converter 5 on the basis of, for example, the secondary voltage $V_s$ of the transformer 3, a current $I_s$ flowing through the reactor 4, voltage $V_d$ on the dc side and a current $I_d$ on the dc side of the converter 5, it is possible to produce a voltage $V_c$ which has a fundamental frequency component whose amplitude and phase are in suitable relationship to the voltage $V_s$.

As shown in FIG. 9(c), if the converter 5 continues to be controlled in spite of occurrence of power interruption at time $t_1$, the secondary side voltage $V_s$ of the transformer 3 will not become zero, but produce a voltage approximately equal to the ac side voltage $V_c$ of the power converter 5. This is because a peak value of the voltage $V_c$ is determined only by the dc side voltage $V_d$ and because the dc side voltage $V_d$ does not become zero immediately after occurrence of power interruption. Ordinarily, the dc side voltage $V_d$ is held at a value larger than the amplitude of the transformer secondary side voltage $V_s$.

Thus, at the time of power interruption, high voltages will occur on the primary and secondary sides of the transformer 3, so that devices may be destroyed due to dielectric breakdown or its service life may be shortened.

On the other hand, if such a power interruption occurs during regenerative operation to regenerate electric power to the overhead wire 1, the dc side voltage $V_d$ will rise rapidly thereby to damage devices not only on the ac side but also on the dc side.

An effective method of solving these events is to stop the power converter 5 at the time of occurrence of power interruption. However, there is no appropriate device which is capable of detecting a power interruption of the power source, and the electric devices have not been sufficiently protected at the time of power interruption.

PREFERRED EMBODIMENTS OF THE INVENTION

FIG. 1 is a block diagram showing the circuit configuration of one embodiment according to the present invention together with the electric conversion system used for control of an electric railcar.

The power cut detection apparatus mainly includes a voltage detection circuit 11 which detects the secondary side voltage $V_s$ of the transformer 3, a first judgement section 20 which receives the voltage signal $V_s$ from the detection circuit 11 to output a signal $P_H$ when the first judgement section 20 detects the fact that the amplitude of the converter ac side voltage component included in the transformer secondary voltage is above a predetermined value, a second judgement section 30 which receives the voltage signal $V_s$ from the voltage detection circuit 11 to output a signal $P_L$ when the second judgement section 30 detects the fact that the amplitude of the transformer secondary voltage is below a predetermined value, and an OR circuit 17 as a gate circuit which performs logical sum of the signals $P_H$ and $P_L$ from the first and second judgement sections.

The details of the first and second judgement sections 20 and 30 are as follows.

The first determination section 20 comprises a high-pass filter 12 which extracts the voltage component indicating the ac side voltage of the power converter 5 from the voltage signal $V_s$, an envelope processing circuit 13 which produces a signal $V_H$ proportional to the amplitude of an output signal from the filter 12, and a comparator circuit 14 which compares the signal $V_H$ with a signal $V_{HS}$ having a predetermined magnitude to produce a logical "1" pulse signal $P_H$ for a duration of predetermined time when $V_H \geq V_{HS}$.

The second judgement section 30 comprises an envelope processing circuit 15 which produces, on the basis of the voltage signal $V_S$, a signal $V_L$ proportional to the amplitude of the power source voltage appearing on the secondary side of the transformer, and a comparator circuit 16 which compares the signal $V_L$ with a signal $V_{LS}$ having a predetermined magnitude to produce a logical "1" pulse signal $P_L$ when $L_L \leq V_{LS}$.

FIG. 2 is a block diagram showing in more detail the circuit configuration of the above embodiment. The envelope processing circuit 13 comprises a full-wave rectifier 13a and a low-pass filter 13b which extracts the low frequency components from the output of the rectifier. The comparator circuit 14 comprises a comparator 14a, an inverter 14b which inverts the output level of the comparator 14a, and a monostable multivibrator 14c which outputs a logical "1" signal for a predetermined time from a rise of the output $P_C$ of the inverter. On the other hand, the other envelope processing circuit 15 also comprises a full-wave rectifier 15a and a low-pass filter 15b which extracts the low frequency components of the output of the rectifier 15a.

The operation of the particular embodiment constructed as above will be described now.

First, if an accident occurs on the system to which the overhand wire 1 is connected, or when the pantograph 2 is disconnected from the overhead wire 1, thereby causing a power interruption, ac side voltage $V_C$ component of the power converter 5 will appear on the secondary side of the transformer 3. FIG. 3(a) shows this voltage waveform wherein the voltage $V_S$ is of a sinusoidal form until the time $t_1$ when the power interruption occurs and is of a pulse width modulated wave after the time $t_1$. This voltage $V_S$ is detected by the voltage detection circuit 11, and the voltage signal $V_S$ is applied to the first and second judgement sections 20 and 30.

In the first judgement section 20, the high-pass filter 12 extracts the ac side voltage component, i.e., the pulse width modulated component, of the power converter 5 and the voltage component thus extracted is applied to the envelope processing circuit 13. Then the envelope processing circuit 12 rectifies the full waves of the pulse width modulated components to eliminate the high-frequency components, thereby resulting in a signal $V_H$ increasing rapidly after time $t_1$, as shown in FIG. 3(b), which is then applied to the comparator circuit 14. In this comparator circuit, the signal $V_H$ is compared with the reference signal $V_{HS}$ to produce a logical "0" signal when $V_H \geq V_{HS}$ and this signal is inverted to a signal $P_C$ shown in FIG. 3(c). Then, a logical "1" signal $P_H$ continuing for a predetermined time from the time $t_2$ when the signal $P_C$ rises is output from the comparator circuit 14.

Thus, the first judgement section 20 outputs the signal $P_H$ shown in FIG. 3(d) and the OR circuit 17 outputs a logical "1" signal $P_D$.

At this time, a controller, not shown, for the power converter recognizes a power interruption by the occurrence of the signal $P_D$ to stop the operation of the power converter 5. Thus the secondary side voltage $V_S$ of the transformer becomes zero at time $t_2$ and the output $V_H$ of the envelope processing circuit 13 lowers toward zero.

On the other hand, the second judgement section 30 rectifies the full waves of the voltage signal $V_S$ to eliminate the high-frequency components, thereby resulting in a signal $V_L$ attenuating gradually after the time $t_2$, as shown in FIG. 3(e). The comparator 16 compares this signal $V_L$ with a reference signal $V_{LS}$ to output a logical "1" signal $P_L$ during the time when $V_L \leq V_{LS}$, i.e., from time $t_4$ to the time when power supply is recovered from the power interrupted condition.

Thus the second judgement section 30 outputs the signal $P_L$ shown in FIG. 3(f) and holds at logical "1" the output of the OR circuit 17 until power supply is recovered from the power interrupted condition.

That is, in this embodiment, a signal $P_C$ indicating that a power interruption has been caused is obtained by detecting the fact that the amplitude of a pulse width modulated component included in the ac power source side voltage when viewed from the reactor 4 is above a predetermined value. On the other hand, a signal $P_L$ representative of continuation of the power interruption is obtained by detecting extinction of the ac power source voltage when viewed from the reactor 4. Then a power cut detection signal is obtained using these signals $P_C$ and $P_L$. However, when the logical sum of these signals is simply performed, the power cut detection signal would become logical "0" for the time duration from time $t_3$ to time $t_4$, as shown by the signal $P_D$, in FIG. 3(h) although power is being interrupted. In order to avoid this, the first judgement section 14 is provided with a monostable multivibrator 14c which produces a logical "1" signal $P_H$ until time $t_5$ and thus produces a logical "1" signal $P_D$ from the time $t_2$ to the time when power supply is recovered from the power interrupted condition.

It should be noted that the time $t_4$ when the signal $P_L$ becomes "1" is dependent upon the time constant of the low-pass filter 15b constituting the envelope processing circuit 15, and therefore the time constant of the monostable multivibrator 14c in determined in consideration of this.

FIG. 4 is a circuit diagram showing the circuit configuration of another embodiment according to the present invention. In FIGS. 4 and 2, like reference numerals denote like elements, respectively. The first judgement section 20a in this embodiment comprises an envelope processing circuit 18 which includes a diode D used instead of the full-wave rectifier 13a in FIG. 2, and a low-pass filter including resistors $R_1$ and $R_2$ and a capacitor C for passing the rectified output from the diode therethrough, and comparator circuit 19 which includes a comparator 19a having a hysteresis characteristic as shown in FIG. 5 and an inverter 19b which inverts the output of the comparator 19a.

Now the operation of this embodiment will be described with reference to the timing chart shown in FIG. 6.

When a power interruption occurs, the ac side voltage component of the power converter 5 occurring on the secondary side of the transformer is applied through the high-pass filter 12 to the envelope processing circuit 18. This envelope processing circuit 18 rectifies the half waves of the input signal using the diode D to eliminate the high-frequency components of the diode output using the low-pass filter comprising the resistors $R_1$ and $R_2$ and the capacitor C, thus to output a signal $V_H$ as shown in FIG. 3(b). In this instance, when the discharge time constant determined by the resistor $R_2$ and the capacitor C is selected to be larger than the time constant determined by the resistor $R_1$ and the capacitor C, i.e., when the resistances of the resistors $R_1$ and $R_2$ are selected so that $R_1 < R_2$, the signal $V_H$ has a waveform which rises rapidly and falls slowly.

When this signal $V_H$ is applied to the comparator 19a, this comparator, having two threshold values, as shown in FIG. 5, outputs a logical "0" signal when the signal $V_H$ exceeds the threshold value $V_{HS}$ and outputs a logical "1" signal when the signal $V_H$ falls below another threshold value $V_{HS}'$ ($V_{HS}' < V_H$). Thus the inverter 19b outputs a pulse signal $P_H$ having a predetermined width, as shown in FIG. 6(c). The width of this pulse signal $P_H$ is determined in consideration of the time constant of the low-pass filter 15b provided in the envelope processing circuit 15 as in the embodiment shown in FIG. 2. The width of the pulse signal $P_H$ can be determined optionally by adjusting the discharge time constant defined by the capacitor C and the resistor $R_2$, by changing the resistances of the feedback resistors $R_3$ and $R_4$ constituting the comparator 19a, and by adjusting the reference voltage $V_{HSS}$.

Thus, this embodiment can not only operate in a manner similar to the embodiment shown in FIG. 2 but also can be further simplified in circuit construction when compared with the embodiment of FIG. 2.

While any of the above embodiments has been described with respect to detection of a power interruption of a power converter used for control of an electric railcar, the present invention is applicable to almost all devices, each of which includes a pulse width modulation system type power converter connected via a reactor to the ac power source, the power converter being required to stop its operation immediately when a power interruption occurs at the ac power source.

As is obvious from the above description, according to the present invention, the converting operation of the power converter is stopped immediately when a power interruption occurs at the ac power source. Thus occurrence of high voltages on the ac and dc sides of the converter can be prevented, so that individual devices connected to the converter are protected satisfactorily from damage.

In addition, when the present invention is applied to a power converter for control of an electric railcar, it will be easy to indicate a power interruption at a driver's eat or the like, thereby allowing the driver to take a special step in the power interruption.

What is claimed is:

1. A power converter having an ac side connected through a reactor to an ac power source and a dc side connected to a smoothing capacitor and a load, said converter being capable of converting and inverting electric power in accordance with pulse width modulation control, comprising:
    (a) a voltage detection circuit for detecting a voltage on the side of the ac power source when viewed from said reactor;
    (b) a first judgement section for detecting that an amplitude of a voltage component on the ac side of said power converter, which is included in the ac power source voltage, is above a predetermined value based on an output signal from said voltage detection circuit to produce an output signal indicative of a first judgement result;
    (c) a second judgement section for detecting that the amplitude of the ac power source voltage is below the predetermined value to produce an output signal indicative of a second judgement result; and
    (d) a gate circuit for performing a logical sum of the output signals from the first and second judgement sections to produce an output signal from said gate circuit indicative of a power interruption of said ac power source.

2. A power converter as set forth in claim 1, wherein said first judgement section comprises a high-pass filter for receiving an output signal from said voltage detection circuit to output the ac side voltage components of said power converter, a first envelope processing circuit for outputting a signal proportional to the amplitude of the output of said high-pass filter, and a first comparator circuit for producing a signal when the output signal from said first envelope processing circuit is above a predetermined value.

3. A power converter as set forth in claim 2, wherein said first envelope processing circuit includes a rectifier and a low-pass filter.

4. A power converter as set forth in claim 2, wherein said first comparator circuit includes a circuit to maintain its output for a predetermined time.

5. A power converter as set forth in claim 2, wherein said rectifier is a full wave rectifier and said first comparator circuit includes a comparator, an inverter and a monostable multivibrator.

6. A power converter as set forth in claim 1, wherein said second judgement section comprises a second envelope processing circuit for receiving an output signal from said voltage detection circuit to output a signal proportional to the amplitude of the ac power supply voltage, and a second comparator circuit for producing a signal when the output signal from said second envelope processing circuit falls below a predetermined value.

7. A power converter as set forth in claim 6, wherein said second envelope processing circuit includes a rectifier and a low-pass filter.

8. A power converter as set forth in claim 7, wherein said rectifier is a half wave rectifier and said first comparator circuit includes a comparator having a predetermined hysteresis characteristic and an inverter.

* * * * *